(12) United States Patent
Furey et al.

(10) Patent No.: US 8,170,035 B2
(45) Date of Patent: *May 1, 2012

(54) DATA FRAME PROCESSING

(75) Inventors: Scott Furey, Cupertino, CA (US); Salil Suri, Fremont, CA (US); Michael Moretti, Saratoga, CA (US); Thomas Wu, Pleasanton, CA (US); David Geddes, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 12/106,125

(22) Filed: Apr. 18, 2008

(65) Prior Publication Data

US 2008/0205441 A1    Aug. 28, 2008

Related U.S. Application Data

(63) Continuation of application No. 10/435,214, filed on May 8, 2003, now Pat. No. 7,382,788.

(51) Int. Cl.
*H04L 12/28* (2006.01)
*H04L 12/56* (2006.01)
*H04J 3/16* (2006.01)
*H04J 3/22* (2006.01)

(52) U.S. Cl. ........................................ 370/401; 370/466
(58) Field of Classification Search .......................... None
See application file for complete search history.

(56) References Cited

U.S. PATENT DOCUMENTS

| 5,307,345 | A | * | 4/1994 | Lozowick et al. | 370/428 |
|---|---|---|---|---|---|
| 6,400,730 | B1 | | 6/2002 | Latif et al. | |
| 6,894,979 | B1 | | 5/2005 | Lee | |
| 7,051,261 | B1 | | 5/2006 | Dhamankar | |
| 7,072,823 | B2 | | 7/2006 | Athanas et al. | |
| 7,114,009 | B2 | | 9/2006 | Jones et al. | |
| 7,209,451 | B2 | | 4/2007 | Frank et al. | |
| 7,349,992 | B2 | * | 3/2008 | Moroney et al. | 709/249 |
| 7,382,788 | B2 | | 6/2008 | Furey et al. | |
| 7,404,000 | B2 | | 7/2008 | Lolayekar et al. | |
| 7,424,519 | B2 | | 9/2008 | Hoshino et al. | |
| 7,453,904 | B2 | * | 11/2008 | Seto | 370/466 |
| 2002/0118692 | A1 | * | 8/2002 | Oberman et al. | 370/419 |
| 2003/0056017 | A1 | | 3/2003 | Gonda | |
| 2003/0093541 | A1 | * | 5/2003 | Lolayekar et al. | 709/230 |
| 2003/0123448 | A1 | * | 7/2003 | Chang | 370/395.1 |
| 2003/0131068 | A1 | * | 7/2003 | Hoshino et al. | 709/216 |
| 2003/0152182 | A1 | | 8/2003 | Pai et al. | |
| 2004/0090918 | A1 | * | 5/2004 | McLendon | 370/237 |
| 2004/0174867 | A1 | * | 9/2004 | Nelson et al. | 370/352 |

* cited by examiner

*Primary Examiner* — Chirag Shah
*Assistant Examiner* — Sun Jin Kang
(74) *Attorney, Agent, or Firm* — James T. Hagler

(57) ABSTRACT

A method and apparatus for bridging network protocols is disclosed. In one embodiment, a data frame is received and stored in a dual-port memory queue by hardware logic. An embedded processor is notified of the data frame once a programmable number of bytes of the data frame have been received and stored. Once notified, the embedded processor may then undertake to read the data frame from the memory queue while the hardware logic is still writing to the memory queue. In one embodiment, the processor may then translate the data frame's protocol and begin transmitting it out over a network connection, all while the data frame's payload is still being received.

14 Claims, 4 Drawing Sheets

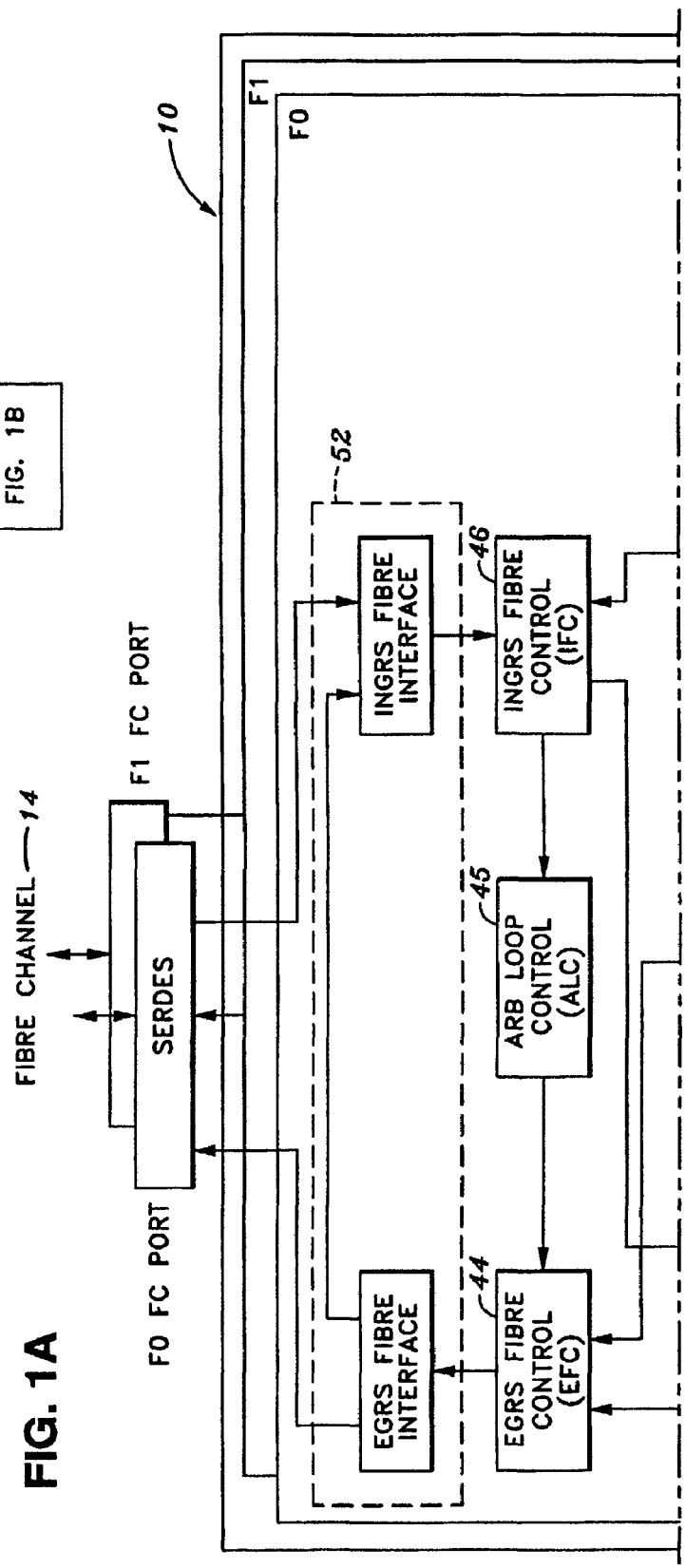

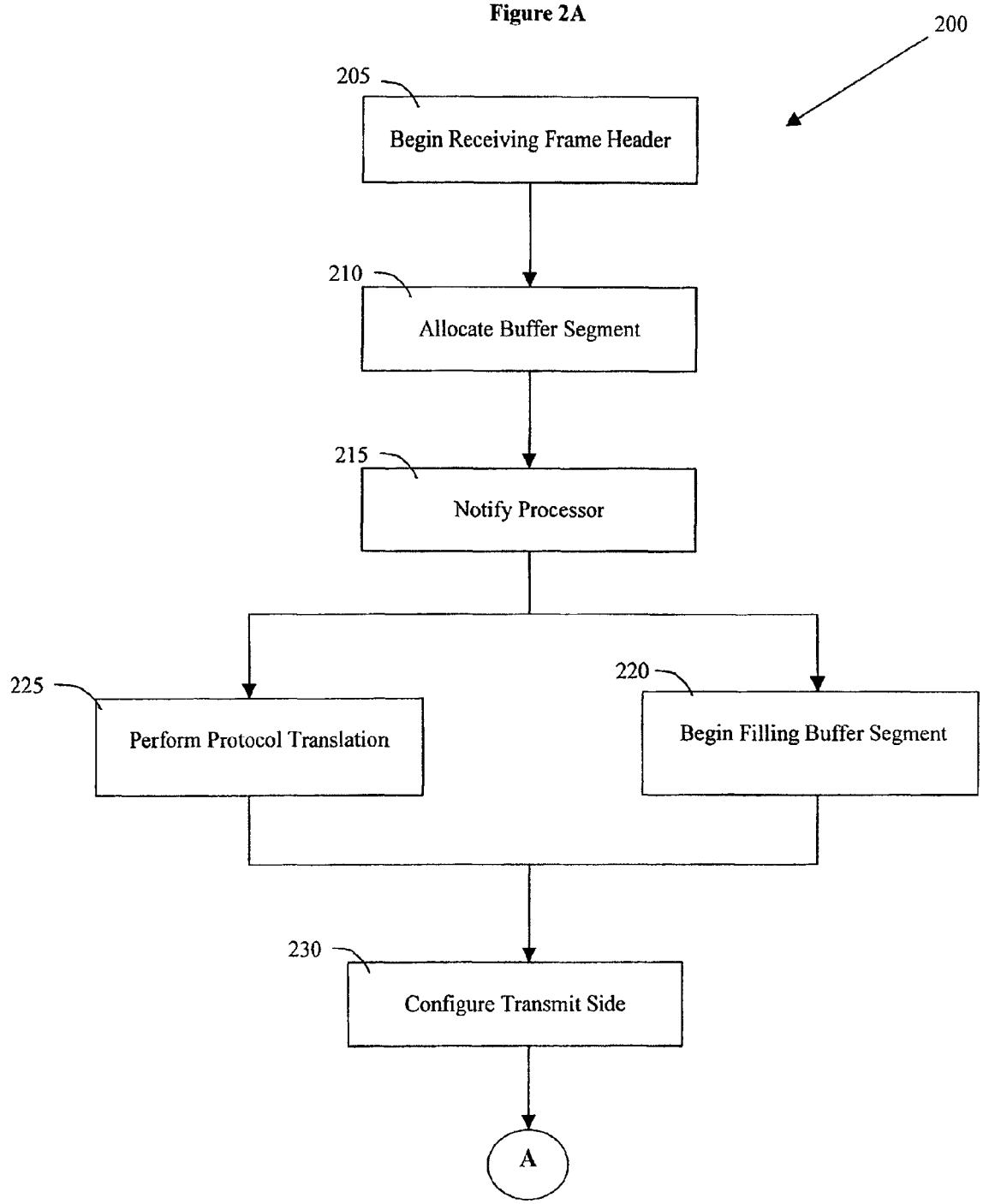

DATA FRAME PROCESSING

CROSS REFERENCE TO RELATED APPLICATIONS

This application is a Continuation of a application entitled, METHOD AND APPARATUS FOR IMPLEMENTING A DATA FRAME PROCESSING MODEL, invented by Furey et al., Ser. No. 10/435,214, filed May 8, 2003, now U.S. Pat. No. 7,382,788; which is incorporated herein by reference.

This application is related to and claims priority from provisional application Ser. No. 60/436,214, entitled "Method and Apparatus for Implementing a Cut-Through Data Processing Model," filed on Dec. 24, 2002.

BACKGROUND OF THE INVENTION

1. Field of the Invention

The present invention relates in general to data networks and more particularly, to a method and apparatus for implementing a data frame processing model.

2. Background of the Invention

Fibre Channel is a computer communications protocol designed to provide for higher performance information transfers: Fibre Channel allows various existing networking protocols to run over the same physical interface and media. In general, Fibre Channel attempts to combine the benefits of both channel and network technologies.

A channel is a closed, direct, structured, and predictable mechanism for transmitting data between relatively few entities. Channels are commonly used to connect peripheral devices such as a disk drive, printer, tape drive, etc. to a workstation. Common channel protocols are Small Computer System Interface (SCSI) and High Performance Parallel Interface (HIPPI).

Networks, however, are unstructured and unpredictable. Networks are able to automatically adjust to changing environments and can support a larger number of connected nodes. These factors require that much more decision making take place in order to successfully route data from one point to another. Much of this decision making is done in software, making networks inherently slower than channels.

Fibre Channel has made a dramatic impact in the storage arena by using SCSI as an upper layer protocol. Compared with traditional SCSI, the benefits of mapping the SCSI command set onto Fibre Channel include faster speed, connection of more devices together and larger distance allowed between devices. In addition to using SCSI, several companies are selling Fibre Channel devices that run Internet Protocol (IP).

With increasing use of Fibre Channel, there is an increased need for efficient transfer of data between Fibre Channel devices and non-Fibre Channel devices. This data transfer requires that the originating protocol be translated to the protocol of the destination network/channel. Traditional protocol bridges process data frames in an inefficient manner which introduces a latency in the frame-based data flow. As such, there is a need for an improved system for bridging network protocols.

BRIEF SUMMARY OF THE INVENTION

Methods and apparatus for bridging network protocols are disclosed. One method comprises receiving a data frame having a source protocol using a first network interface, storing the data frame in a memory using a circuit, and notifying a processor of said data frame once a programmable number of bytes of the data frame have been stored. The method further comprises executing instructions sequences to cause the processor, during storing of the data frame by the circuit, to read the data frame from the memory, translate the first protocol to a destination protocol, and transmit the data frame to a second network interface according to the destination protocol.

Other embodiments are disclosed and claimed herein.

BRIEF DESCRIPTION OF THE DRAWINGS

FIG. 1A-1B illustrates a block diagram of one embodiment of an ASIC capable of carrying out one or more aspects of the present invention.

FIGS. 2A-2B describes one embodiment of a process for protocol bridging consistent with the principles of the invention.

DETAILED DESCRIPTION OF EXEMPLARY EMBODIMENTS

One aspect of the invention is to cause receiving and sending operations in a protocol bridge to overlap, thereby reducing frame latency. In one embodiment, a data frame is received and stored in a dual-port memory queue by hardware logic. An embedded processor is then notified of the data frame once a programmable number of bytes of the data frame have been received and stored. Once notified, the embedded processor may then undertake to read the data frame from the memory queue while the hardware logic is still writing to the memory queue. In another embodiment, the processor may translate the data frame's protocol and cause the translated data frame to begin being transmitting out over a network connection, all while the original data frame's payload is still being received. In one embodiment, the data frame is being transferred between a Fibre Channel interface and a Packet-over-SONET Physical Layer interface.

Another aspect of the invention is to implement a method to invalidate the data frame in case of an error. While in one embodiment the error is a receiver, error that occurs after an embedded processor has configured the transmit side, transmit hardware can also invalidate the data frame if any errors are detected during transmission.

Since the transmission and reception of a translated-protocol frame may overlap according to the present invention, one aspect of the invention is to enable the transmitting side of a protocol bridge to be aware of the final reception status of the frame before completing the transmission. Thus, in one embodiment, each payload buffer segment has an associated frame status. When the last word of the data frame is written into a buffer segment, the frame status for that buffer segment may be captured by a buffer manager and relayed to the transmitting side of the protocol bridge.

I. System Overview

A. Hardware Design

Figure 1B:
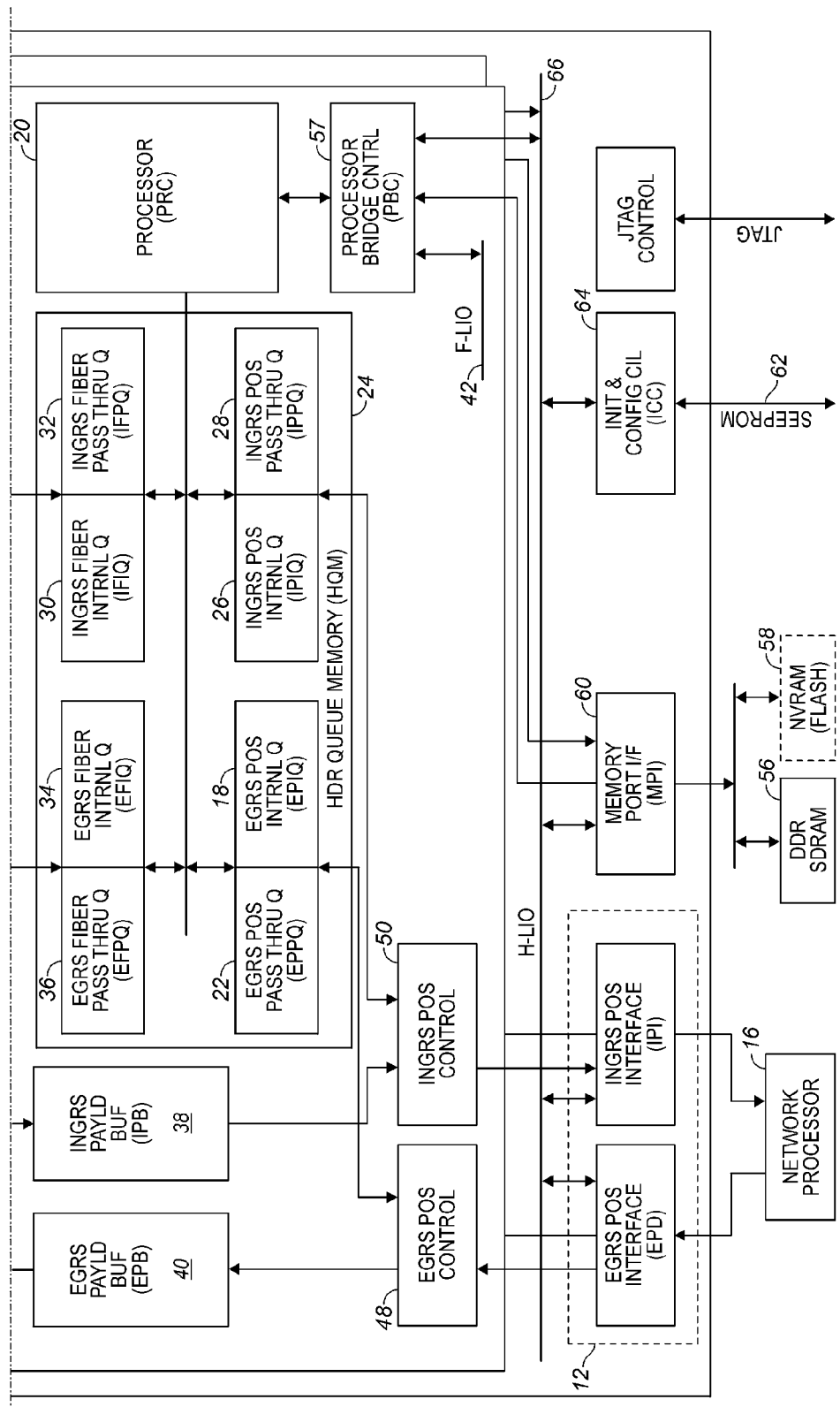

FIGS. 1A-1B illustrate a block diagram of one embodiment of an ASIC 10 capable of carrying out one or- more aspects of the present invention. In the embodiment of FIGS. 1A-1B, the ASIC 10 includes two Fibre Channel (FC) ports, F0 Port and F1 Port, with hardware associated with the F0 Port residing on the P0 function level and hardware associated with the F1 Port residing on the F1 function level. It should be appreciated, however, that there may be more or fewer FC ports and one or more of the hardware components for different FC functions may be integrated onto the same function level.

Ingress (Ingrs) and egress (Egrs) references in FIGS. 1A-1B describe the data path direction between the Packet-over-SONET Physical Layer (POS/PHY—abbreviated as POS hereafter) interface 12 and the Fibre Channel 14. However, while FIGS. 1A-1B and the following description are directed to sending and receiving data between a Fibre Channel interface and a POS interface, it should equally be appreciated that the principles of the invention may similarly be applied to other network protocols and other applications. For example, rather than having a POS interface 12 coupled to a POS network, the interface may be a System Parallel Interface (a/k/a System Packet Interface), Utopia or Flexbus. Similarly, rather than having a Fibre Channel interface coupled to Fibre Channel 14, ASIC 10 may be interfaced to an IEEE-1394, Infiniband, and/or iSCSI network. However, for brevity the following discussion with refer to only POS networks and Fibre Channel.

The Network Processor 16 may be any processor to which the ASIC 10 interfaces through the POS interface. The Egress POS Internal Queue (EPIQ) 18 may contain headers of frames received from the POS interface 12. In one embodiment, POS frames that will be processed by the internal embedded processor (PRC) 20 are routed to the EPIQ 18. Similarly, the Egress POS Pass Through Queue (EPPQ) 22 may contain headers of POS frames received from the POS interface, where the payloads for such POS frames are intended to pass through the ASIC 10 to Fibre Channel 14. In the embodiment of FIG. 1B. both EPIQ 18 and EPPQ 22 are components of Header Queue Memory (HQM) 24.

Continuing to refer to FIGS. 1A-1B, the Ingress POS Internal Queue (IPIQ) 26 may contain headers of POS frames that have been generated by PRC 20. In addition, the Ingress POS Pass Through Queue (IPPQ) 28 may contain headers for POS frames whose payloads were received from the Fibre Channel 14. Ingress Fibre Internal Queue (IFIQ) 30, as shown in FIG. 1B, may contain headers of frames received from the Fibre Channel 14. In one embodiment, FC frames whose payloads will be processed by the PRC 20 may be routed to the IFIQ 30. Moreover, Ingress Fibre Pass Through Queue (IFPQ) contains headers of frames received from the Fibre Channel 14, according to one embodiment. FC frames whose payloads will pass through the ASIC 10 to the POS interface 12 may be also be routed to the IFPQ 32.

In the embodiment of FIG. 1B, the Egress Fibre Internal Queue (EFIQ) 34 may contain headers of FC frames that have been generated by the PRC 20. In that case, the frames may be sent out on the Fibre Channel 14. Moreover, the Egress Fibre Pass Through Queue (EFPQ) 36 contains headers of FC frames whose payloads were received from the POS interface 12, according to another embodiment.

In one embodiment, the memory queues of HQM 24 (e.g., EFPQ 36, EFIQ 34, EPPQ 22, EPIQ 18, IFIQ 30, IFPQ 32, IPIQ 26, and IPPQ 28) are shared dual-port RAM that is accessible by the ASIC 10 hardware logic as well as PRC 20.

The Egress POS Control (EPC) 48 module may be used to provide read functionality to transfer data from the Network Processor 16 (or associated memory) to the Egress Payload Buffer (EPB) 40 module or to the Egress POS queue memory of HQM 24. Similarly, the Ingress POS Control (IPC) 50 module may be used to provide the DMA write function to transfer data to the Network Processor 16 (or associated memory) from the Ingress Payload Buffer (IPB) 38 module or the Ingress POS queue memory of HQM 24.

The IPB 38 of FIG. 1B may contain payloads for frames that will be sent to the POS Interface 12. It should be appreciated that the payloads may have come from the Fibre Channel 14 or may have been created internally by the PRC 20. Moreover, the EPB 40 may contain payloads for frames that will be sent out on the Fibre Channel 14, where the payloads may either have come from the POS interface 12 or may have been created by the PRC 20.

The Fibre Channel interface provides the interface and control between the Fibre Channel and the ASIC 10. In the embodiment of FIGS. 1A-1B, the Fibre Channel interface consists of 4 major modules the Egress Fibre Channel Control (EFC) 44, Arbitrated Loop Control (ALC) 45, Ingress Fibre Channel Control (IFC) 46 and Fibre Channel Interface (FCI) 52 modules. In particular, the EFC module 44 may be used to provide the frame flow control mechanism of the FC transmitting port (i.e., FO or F1), while other operations which may be performed by the EFC module 44 include frame assembly, CRC generation, and retransmission of certain data from the ALC module 45 (e.g., L_Port data). In one embodiment, the EFC module 44 assembles and transmits frames to the FCI module 52 based on the data from HQM 24, EPB 40, arid the ALC module 45.

In the embodiment of FIG. 1A, the ALC module 45 is located between the IFC module 46 and EFC module 44. In one embodiment, this module consists primarily of a Loop Port State Machine (LPSM) whose main function is to continuously monitor the data stream coming from the IFC module 46. The LPSM may further be used to monitor commands from the PRC 20 and the EFC module 44. In one embodiment, the EFC 44 may send a command to the LPSM which defines the function to be performed by the ALC module 45 such as loop arbitration, open loop, close loop, etc. In another embodiment, the LPSM may be controlled by the PRC 20.

In one embodiment, the ALC module 45 may be used to detect different primitive signals or sequences (e.g., LIP, LPE, LPB, MRK, NOS, OLS, LR and LRR) and respond accordingly. In the ioop topology, data from the IFC module 52 may be either passed on to the EFC module 44, or substituted with a primitive sequence depending on the function to be performed. The substitution may be either by the state machine itself or signaled from the EFC module 44.

The IFC module 46 may receive a data stream from the FCI module 52 and provides functions that may include frame disassembling, frame header matching and routing, FC_FS primitive signal and sequence detection, CRC checking and link interface integrity measurement. In one embodiment, the data received from the FCI module 52 is passed on to the ALC module 45 for retransmission during a private/public loop (L_Port) monitoring state. When not in the monitoring state, each frame received may be examined and routed to the appropriate destination modules. If the frame has a payload, the payload may be written into the next available buffer segment in the IPB module 38, according to one embodiment.

The Processor Bridge Controller (PBC) module 54 provides the interfaces that connects the embedded processor (e.g., PRC 20) to the rest of the ASIC 10 hardware. In the embodiment of FIG. 1B. PRC 20 is coupled to the PBC module 54 via a PIF bus, which may be a general purpose I/O bus that supports burst reads and writes as well as pipelined single access reads and writes. In another embodiment, PRC 20 can also use the PBC module 54 to interface with external memory devices such as DDR/SDRAM 56 and NVRAM 58 attached to the ASIC 10 through the Memory Port I/F (MPI) module 60, or SEEPROM 62 through the Initialization and Configuration Control (ICC) module 64. In yet another embodiment, the PBC module 54 may also provide bidirectional bridging between the F_Lb bus 42 and Host Local I/O (H_LIO) bus 66. In one embodiment, F_LIO bus 42 may be used to provide access to registers in other hardware blocks through arbitration.

As previously mentioned, the MPI module 60 may be used to provide arbitrated accesses to external memory (e.g., DDR SDRAM 56 and/or NVRAM 58) devices by the PRC 20, as well as to every bus master on the internal H_LIO bus 66.

In one embodiment, the ICC module 64 includes a Serial Memory Control (SMC) module, which can be used to initialize internal registers and provide read/write access to SEEPROM 62. The ICC 64 may also include a trace control module (not shown) to provide external visibility of the internal signals.

B. Frame Egress

In the embodiment of FIG. 1A-1B, each frame that is received from the POS interface 12 may be routed to one of the two FC function levels (F0 or F1). As mentioned previously, there may be more or fewer than two FC function levels, in which case the frames received from the POS interface 12 would be routed to whatever number of available FC function levels there may be. In one embodiment, frames are routed based (at least in part) on a port routing byte in a given frame header. In one embodiment, the port routing byte is located in the third byte of the frame header, although it should of course be understood that the port routing byte may be located elsewhere in the frame.

After the frame arrives at the selected function (e.g., F0 or F1 in this embodiment), a second routing decision may then be made based on a path routing bit. In one embodiment, the path routing bit is located in the POS frame header, and may be located in one of the first four bytes of the POS frame header. The path routing bit may be used to determine whether the frame will be routed to the "Pass-Through Path" or to the "Internal Path," where the Pass-Through Path is for frames containing payloads that are going to be sent out on Fibre, and the Internal Path is for frames whose payload contains configuration or control information that will be used by the PRC 20 and not sent out on Fibre.

In one embodiment, after the above-described routing decisions have been made, the received frame header is stripped from the payload and is stored in an entry in an Egress POS Queue (such as EPPQ 22 or EPIQ 18) that is dedicated to the selected function/path. A programmable number of bytes from the payload may also be stored along with the header. The payload may then be separated from the frame and stored in the next available segment of the EPB 40 for the given FC function (F0 or F1). A handle indicating which payload segment was used is stored by hardware in the HQM 24 queue which received the POS frame header.

In the case where the frame was routed to the Pass-Through Path, a portion of the frame header may be compared with the corresponding bytes from the previous frame's header. If the contents of the bytes are equal, a 'header match' bit in the HQM 24 entry may be set indicating that the frames belong to the same context. It should be noted that the location of the bytes to be compared may be programmable via a bit mask. At this point, the PRC 20 may be notified that a frame has been received, while in another embodiment the PRC 20 is notified before the entire payload has been received.

It should be appreciated that the PRC 20 may undertake a variety of operations at this point which may dependent upon several factors, including the path and contents of the frame, whether initialization has been completed, and in the case of an FCP frame, whether a command context already exists. Moreover, the PRC 20 may undertake a frame Pass-Through operation and/or an Internal Frame operation, as will now be described.

1. Pass-Through Frame Operation

As mentioned previously, a given frame may be routed to a Pass-Through Path or an Internal Path, depending on its path routing bit. Where the frame was routed to the Pass-Through Path, the PRC 20 may be used to write the information necessary to create a suitable PC frame header. In one embodiment, the FC frame header is created in the next available entry in the EFPQ 36, although it may also be stored elsewhere. In one embodiment, the PRC 20 may also copy the payload segment handle to this EFPQ 36 entry. Moreover, if the frame belongs to the same context as the previous frame, a bit may be set in the HQM 24 entry (e.g., EFPQ 36 entry) that instructs the hardware to automatically generate portions of the FC header based on values from the most recent FC frame that was generated from that queue.

After the PRC 20 has finished setting up the outgoing frame header, control of the HQM 24 entry may then be turned over to the hardware by setting a control bit in the entry's control word. Other methods for releasing the entry may also be used. Once control of the HQM 24 entry has been turned over to the hardware, the entry may then be queued up for transmission from one of the FC Ports. In one embodiment, frames that are released to the hardware are sent out on the FC Ports in the order in which they were released by the PRC 20. However, it should be appreciated that frames may be sent out in any number of other orders.

After the PRC 20 has set up an outgoing entry in the EFPQ 36, it may release the entry in the incoming EPPQ 22. In one embodiment, the entry is released by resetting a bit in the control word of the entry. Once released, the entry location may be reused for another egress POS frame header.

When the entry in the EFPQ 36 reaches the head of an HQM 24 queue, the hardware may automatically assemble an FC frame and send it out on the Fibre Channel 14, according to one embodiment. According to another embodiment, when this has been completed the hardware puts the completion status of the operation into the EFPQ 36 entry, and turns the entry over to the software. The EPB 40 segment may be returned to the free pool, or it may be returned by the PRC 20 after it checks the completion status in the HQM 24 entry.

2. Internal Frame Operation

If, on the other hand, the frame was routed to the Internal Path, the payload may be intended for use by the PRC 20. A programmable number of payload bytes may be made available to the PRC 20 in the entry in the EPIQ 18. In one embodiment, the EPIQ 18 may be made available to the PRC 20 in zero-wait-state memory. Moreover, additional payload bytes may be made available to the processor via the F_LIO bus 42 (e.g., F0_LIO and F1_LIO).

After the PRC 20 has finished processing the information from the frame, it may release the entry in the EPIQ 18 to the hardware by resetting a bit in the control word of the entry. In one embodiment, the PRC 20 returns the payload buffer segment to the free pool by writing a segment handle to the payload segment release register.

3. Special Payload Buffer

If the PRC 20 needs to generate an egress PC frame, in one embodiment it may do so using the EFIQ 34 and a Special Payload Buffer (not shown). In one embodiment, the Special Payload Buffer is a single segment buffer consisting of 512 bytes and resides in zero-wait-state processor memory. After the PRC 20 has put the required information into the HQM 24 entry (e.g., in the EFIQ 34 entry) and Special Payload Buffer, the frame may then be released to the hardware by setting a bit in the HQM 24 entry, causing the frame to be sent out when the entry reaches the head of the particular queue.

4. Optional Headers

When a POS frame is received, its payload may be placed into an entry in the EPB 40. For Pass-Through payloads, the PRC 20 may occasionally be required to insert an optional FC header between the FC header and the payload received from the POS interface 12. In order to accommodate this, a predetermined number of bytes may be allocated in each entry in the egress FC Header queues (e.g., EFPQ 36 and EPPQ 22). In one embodiment, the predetermined number of bytes is 72 bytes. When the PRC 20 needs to insert an optional header, it writes the header to one or more of these spare byte locations in the HQM 24 entry, according to one embodiment. In addition, the PRC 20 may write the length of the optional header to a field (e.g., imm_datafld_size field) of the HQM 24 entry. Once the given HQM 24 entry has been turned over to the hardware and has reached the head of the queue, the entry may be sent out to the Fibre 14. In one embodiment, the FC header is sent out first, followed by the bytes containing the optional FC header, followed by the payload. If multiple FC frames are generated from one entry in an FC Header queue, the hardware may be configured to include the optional header in each FC frame, or alternatively, in only the first frame.

5. Raw Frames

Raw FC frames may be received from the POS interface 12 and sent out on the Fibre Channel 14 using the same process used with Pass-through frames described above in Section I.B.1. POS frames containing encapsulated raw PC frames may be routed to the Pass-Through path. In one embodiment, the POS frame header is stripped off and is placed into an entry in the EPPQ 22, while the encapsulated FC raw frame is automatically placed into the next available segment of the EPB 40.

After the PRC 20 has been notified of the arrival of the POS frame, it may then perform the steps described above in Section I.B.1., except that a bit may be set in the EFPQ 36 that direct the system to take most the information needed to build the PC frame header from the raw FC frame in the EPB 40, rather than from the HQM 24 entry. In one embodiment, when this bit is set, the only fields that are taken from the HQM 24 entry are the SOF and EOF characters, and the S_ID and D_ID (i.e., Source-ID and Destination-ID, respectively). The remaining FC header fields may then be taken directly from predefined locations in the raw frame in the EPB 40.

Additional bits in the HQM 24 entry may be used by the PRC 20 to determine which mechanism will be used to generate the CRC ("Cyclic Redundancy Check") checksum for the Fibre Channel 14 frame. In one embodiment, the possible mechanisms include: a) using the checksum located in the raw frame in the EPB 40, b) using a hardware generated checksum in the place of the one located in the EPB 40, and c) appending a hardware generated checksum to the end of the data in the EPB 40.

6. Cut-Through and Store-Forward Modes

In one embodiment, ASIC 10 provides two modes of operation. With the first mode, referred to herein as the Store-Forward mode, frames are received in their entirety from the POS interface 12 before they are sent out on the Fibre Channel 14. Alternatively, as mentioned above, one aspect of the invention is to implement a Cut-Through mode. As will be described in more detail below in Section II, after a frame header and a programmable number of payload bytes have been received from the POS interface 12 in this mode, the frame may be output on the Fibre Channel 14. Thus, receiving and sending operations may overlap. In one embodiment, Cut-through mode may be enabled on a frame-by-frame basis.

7. Small FC Frames

Some Fibre Channel devices may negotiate a maximum FC payload size that is less than a nominal size, which in one embodiment is just over 2KB. In one embodiment, this negotiated size may be 512 bytes, although other sizes may also be negotiated. In such a case, ASIC 10 may allow the Network Processor 16 to send nominal sized POS frames (e.g., 2KB) to the ASIC 10 for such devices, but will segment the POS frame into multiple FC frames to accommodate the smaller negotiated FC payload size.

When a POS frame is received by the ASIC 10, the header and payload may be separated and routed to the EPPQ 22 and EPB 40 in the same manner described above for Pass-Through operations. In order to accommodate the smaller negotiated FC payload size, when the PRC 20 sets up an outgoing FC frame header in the EFPQ 36, it may indicate the negotiated size of the FC payload for a given device in the field in the HQM 24 entry (e.g., the 'maximum-send-size' field).

By way of a non-limiting example, the maximum-send-size field may be programmed with a value of 512 bytes instead of the nominal value of 2K. The remainder of the fields in the FC HQM 24 entry may then be filled in by the PRC 20 in the usual manner, after which the entry is released to the hardware. When the entry in questions in the EFPQ 36 reaches the head of the queue, the value in the 'maximum-send-size' field may be compared to the value in another field (e.g., the 'expected-payload-size' field) of the same entry. If the 'expected-payload-size' field is larger, the system will generate multiple Fibre Channel frames. While in one embodiment, the generated multiple FC frames each have the payload size indicated by the 'maximum-send-size' field, it should be appreciated that they may also have smaller payload sizes. In one embodiment, the generated FC frame use information from the original HQM 24 entry, while in another embodiment, the hardware automatically increments certain fields in the subsequent FC headers, such as the SEQ_CNT and Relative Offset fields.

Moreover, if the FC HQM 24 entry indicates that the data contained in the payload is the last data in an FC sequence, or that the FC Sequence Initiative should be transferred, the appropriate bits may be set in the header of only the last FC frame that is generated.

8. Jumbo Frames

Another aspect of the invention is for the ASIC 10 to be configurable to accept normal frames, jumbo frames, or an intermix of normal and jumbo frames from the POS interface 12. For purposes of the present discussion, a normal frame is defined as a frame whose payload can fit into a single segment of the EPB 40, while a jumbo frame is a frame whose payload spans two or more segments of the EPB 40. In one embodiment, the maximum size of a jumbo frame is configurable up to a maximum of 32K bytes.

When a jumbo frame is received on the POS interface 12, the system may automatically allocate the necessary number of EPB 40 segments to hold the frame. Also, the system may allocate an entry in the EPPQ 22 for each EPB 40 segment that is allocated. These additional HQM 24 entries do not contain copies of the POS header, according to one embodiment. Instead, they may merely contain a pointer to a EPB 40 segment and indicate that the buffer segment contains overflow data belonging to the previous entry(ies) in the POS queue of the HQM 24.

While a jumbo frame is being received on the POS interface 12, the POS HQM 24 entries that are associated with each new EPB 40 segment may be turned over to the processor incrementally as each EPB 40 segment is allocated. In one embodiment, each time the PRC 20 receives a POS HQM 24 entry, it sets up an entry in the FC queue of the HQM 24, copies the EPB 40 segment handle to it, and turns the FC HQM 24 entry over to the hardware. Using this mechanism, the hardware may send an FC frame containing the first portion of a jumbo frame payload out on the Fibre 14 while the remainder of the jumbo frame payload is still being received on the POS interface 12.

Since all of the FC frames generated from a jumbo frame will typically belong to the same context, the system is only required to set up a full FC header for the first PC frame. In one embodiment, the hardware may be programmed to automatically generate the FC headers for each subsequent FC frame based on information from the preceding frame, as described in co-pending U.S. patent application Ser. No. 10/434,872, entitled "Method and Apparatus for Controlling Information Flow Through a Protocol Bridge," filed on May 8, 2003, the contents of which are incorporated herein by reference.

If the final FC frame generated from a jumbo frame will be required to transfer the PC Sequence Initiative, or to end a sequence, the PRC 20 should know in advance what the overall length of the jumbo frame will be. In one embodiment, this may be accomplished by including a frame size field in the header of the POS jumbo frame.

9. Arbitration

In one embodiment, egress FC Frames may originate in either the EFPQ 36 or the EFIQ 34. At any point in time, there may be multiple FC frame headers in each of these queues waiting to go out on the wire.

Within each queue, PC frames will be output in the order in which they were released to the hardware, according to one embodiment. However, the same principle need not apply between queues. For example, frames that are waiting in one queue may be delayed while newer frames in the other queue go out on the Fibre 14.

In one embodiment, the arbitration algorithm has two settings: 'ping-pong' and 'sequence'. When the arbiter is programmed for ping-pong mode, egress FC frames may be taken from the EFPQ 36 and the EFIQ 34 in alternating order, one at a time from each queue. When the arbiter is programmed for sequence mode, frames from the EFPQ 36 which belong to the same command context as the previous frame may be given priority. Thus, once a context begins, all frames belonging to it may be transmitted. In such a case, at the end of each context (or when the queue is empty), a frame from an FC Internal Queue (e.g., the EFIQ 34) may then be transmitted.

10. Egress Error Handling

Error handling may be accomplished by a combination of hardware error detection and software error recovery procedures. The following will describe one embodiment of the hardware detection capabilities of the ASIC 10 egress path.

Each POS frame received by the ASIC 10 will typically contain a Frame CRC checksum. When an error is detected in this checksum, a status bit may be set in the segment of the EPB 40 that received the payload, according to one embodiment. The manner in which the error may be handled is dependent (at least in part) on whether the frame header was routed to the Pass-Through Path or to the Internal Path.

If the header was routed to the Internal Path, the PRC 20 may be notified of the arrival of the frame after the payload has been fully received. In this embodiment, the PRC 20 would check the receive status before processing the payload. If this check reveals that a receive error occurred, a software recovery procedure may be called. In one embodiment, part of the software recovery procedure would include returning the EPB 40 segment to the free pool, and releasing the HQM 24 entry to the hardware.

If the header was routed to the Pass-Through path, the PRC 20 may be notified of the arrival of the POS frame after the header is received, but while the payload is still in transit. Upon notification of the arrival of the POS header, the PRC 20 may create an FC header in an entry in the EFPQ 36 and release the entry to the hardware. This will normally occur before the POS CRC error is detected.

In order to handle this situation, the hardware that assembles the outgoing FC frames may be designed to examine the receive status field of the EPB 40 segment before it initiates the FC frame. If the status field indicates that a problem was encountered while receiving the POS frame, in one embodiment the state machine may transfer this status information to the entry in the EFPQ 36, turn the entry over to the software, and halt without outputting the FC frame. The software may then decide how to recover from the error. In one embodiment, part of the recovery procedure would include returning the EPB 40 segment to the free pool and returning the FC HQM 24 entry to the hardware.

If Cut-Through mode (which will be discussed in more detail below in Section II) is enabled, the system may start sending out FC frame before the POS CRC error is detected. Such an error will typically be detected, however, before the end of the FC frame has been transmitted. When this occurs, the hardware will end the FC frame with an EOFni (End of Frame, normal Invalid), according to one embodiment. It should be appreciated that other frame termination methods may be used including, for example, EOFdti (EOF, disconnect terminate invalid. In another embodiment, the status field of the entry in the FC HQM 24 may be updated with information about the error, the entry turned over to the software, and the hardware state machine halted. It should be appreciated that the software may then decide how to recover from the error.

Moreover, an additional hardware feature may be provided to help minimize the software recovery process. In one scenario, the frame with the CRC error advanced to the head of the EFPQ 36 before the software became aware of the error. By that time, the HQM 24 could have contained headers of additional frames belonging to the same context. Furthermore, these frames could be interleaved with frames from other contexts. In order to allow the PRC 20 to easily purge frames belonging to a specific context from the HQM 24, a 'skip' bit may be provided in each entry in the HQM 24. When an error is detected, the PRC 20 can examine each subsequent entry in a particular queue and set the skip bit in each frame it wants to purge. In one embodiment, this may be done before the PRC 20 re-enables the hardware. Once re-enabled, the hardware may process the HQM 24 in order, beginning with the entry after the one with the error. Thus, in this embodiment, each time an entry in which the skip bit set reaches the head of queue, its contents may be ignored, the entry returned to the software and the next entry processed.

Errors may also be encountered by the Egress Fibre Control (EFC) 44 module while sending FC Frames out on the wire. Such errors may be posted in the HQM 24 entry which originated the frame. After each FC frame is completed, either successfully or unsuccessfully, the HQM 24 entry that originated the frame may be returned to the software. The PRC 20 may then examine the status field of the entry and if required, take appropriate recovery action.

One additional error condition may occur if Cut-Through mode is improperly set up. An error (e.g., 'buffer under run') can occur when a frame is being simultaneously received on the POS interface 12 and sent out on the Fibre 14. The error occurs if the speed on the sending side is greater than the speed on the receiving side and the buffer runs out of data to send. If this occurs, the logic that generates the FC Frame may terminate the frame with an EOFni. The status field of the FC HQM 24 entry that originated the frame may then be filled in with information indicating the action taken, and the entry may be turned over to the software. In one embodiment, the processing of FC frames from the Pass-through path is then halted. The software then has the option of re-transmitting the frame using the original HQM 24 entry, re-transmitting it using a new HQM 24 entry, or executing a recovery protocol.

C. Frame Ingress

Each frame that is received from the Fibre Channel 14 may be routed to either the "Pass-Through Path" or the "Internal Path." In one embodiment, the Pass-Through Path is for frames containing payloads that will be sent out on the POS interface 12, while the Internal Path is for frames whose payload contains initialization, configuration or control information that will be used by an internal processor (e.g., PRC 20), but not sent out on the POS interface 12. In one embodiment, the path to which the frame is routed is based on the contents of the R_CTL field in the FC frame header.

After the routing decision has been made, the frame header may be stripped from the payload and stored in an entry in one of the two ingress FC Header Queues, according to the path (Pass-Through or Internal) that has been chosen. A programmable number of bytes from the payload may also be stored along with the header in the selected Header Queue entry. In the embodiment of FIG. 1B, the two ingress FC Header Queues are the IFIQ 30 and the IFPQ 32.

In one embodiment, the header of the incoming FC frame is compared to the header of the most recent FC frame that was routed to the same path. If certain fields match, a bit in the status field of the FC HQM 24 entry may be set indicating that the frame belongs to the same context and is sequential.

The payload may then be separated from the frame and stored in the next available segment of the IPB 38, according to one embodiment. A handle indicating which payload segment was used may also be stored in the FC HQM 24 entry that received the FC frame header. While in one embodiment the PRC 20 is notified that a frame has been received after the entire payload had been received, in another embodiment, this notification may occur before the entire payload has been received.

It should be appreciated that the PRC 20 may undertake a variety of operations at this point. The PRC 20 operation may be dependent upon several factors, including the path and contents of the frame, whether initialization has been completed, and in the case of an FCP frame, whether a command context already exists. Moreover, the PRC 20 may undertake a frame Pass-Through operation and/or an Internal Frame operation, as will now be described.

1. Pass-Through Frame Operation

If the frame was routed to the Pass-Through path, the header would have been placed in an entry in the IFPQ 32, according to one embodiment. When the entry is turned over to the PRC 20, the PRC 20 may examine it and write the information necessary to create a suitable POS frame header in the next available entry in the IPPQ 28. A payload handle may also be copied from the FC HQM 24 entry to the POS HQM 24 entry. In another embodiment, if the frame belongs to the same context as the previous frame, it may use a mask field in the POS HQM 24 entry to tell the hardware to reuse portions of the previous POS frame header.

After the PRC 20 has finished setting up the outgoing POS frame header in the IPPQ 28, it may release the entry to the hardware. In one embodiment, this is done by setting a bit in the entry's control word. When the entry reaches the head of the queue, the hardware may automatically assemble the POS frame and send it out on the POS interface 12.

After the PRC 20 turns the entry in the IPPQ 28 over to the hardware, it no longer needs the entry in the IFPQ 32. Thus, in one embodiment the IFPQ 32 entry is released to the hardware for use by another Ingress FC frame by setting a bit in the entry.

When the entry in the IPPQ 28 reaches the head of a given queue, the hardware may then assemble a POS frame and send it out on the POS interface 12. When this has been completed, the completion status may be put into the outgoing HQM 24 entry that originated the frame, and the entry turned over to the software. Moreover, the payload buffer segment may be returned to the free pool, or it may be returned by the PRC 20 after the processor checks the completion status in the HQM 24 entry.

2. Internal Frame Operation

If the frame was routed to the Internal Path, the payload may be used by an internal processor (e.g., PRC 20). In one embodiment, a programmable number of payload bytes are available to the PRC 20 in the IFIQ 30, which may also be accessible to the PRC 20 in zero-wait-state memory. In another embodiment, additional payload bytes may be examined by the PRC 20 via the F_LIO bus 42.

After the PRC 20 has completed processing the FC HQM 24 entry, it may then return the entry to the hardware by setting a bit in the control word of the entry. The payload buffer segment may also be returned to the free pool by writing the segment's handle to a register (e.g., "Payload Segment Release Register").

3. Special Payload Buffer

If the embedded processor (e.g., PRC 20) needs to generate an ingress POS frame, it may do so using the IPIQ 26 and the Special Payload Buffer. In one embodiment, the Special Payload Buffer is a single segment buffer consisting of a predetermined number of bytes (e.g., 512 bytes) and resides in zero-wait-state processor memory. It should, however, be appreciated that other buffer configurations may also be used.

It should also be understood that the use of the Special Payload Buffer is optional, and will typically be used where the payload of the frame is too large to fit into the spare bytes in the Header Queue entry. By way of a non-limiting example, when a nominal configuration of 128 bytes per Header Queue entry is used, there are 96 bytes available in each HQM 24 entry for a POS header and POS payload. If the total number of bytes of the frame to be sent is 92 or less, the entire frame can be put into an HQM 24 entry. Otherwise, the Special Payload Buffer may be used.

After the PRC 20 has put the required information into the HQM 24 entry and Special Payload Buffer, it may then turn the frame over to the hardware by setting a bit in the HQM 24 entry. In one embodiment, the hardware will queue the entry and send the frame out on the Fibre 14 when the entry reaches the head of the queue.

4. Optional Headers

When an FC frame is received, the FC header may be separated from the payload and stored in one of the two ingress FC Header Queues (Internal or Pass-Through). In one embodiment, a programmable number of additional bytes from the FC frame are also stored in the Header Queue entry (e.g., HQM 24 entry). In another embodiment, the complete payload (everything after the FC header) may be stored in the next available segment of the IPB 38. If the bytes following the FC header contain an optional header, it may be located in the beginning of the payload buffer segment, as well as in the HQM 24 entry. In one embodiment, the PRC 20 may examine the optional header by reading it from the HQM 24 entry.

If the payload is to be forwarded to the POS interface 12, the PRC 20 may choose to exclude the optional FC header from the POS frame. In one embodiment, this is done by indicating the length of the optional header in a field (e.g., the "segment offset" field) of the ingress POS header queue entry that it generates for the frame. When the payload is transferred, the hardware may then skip the number of bytes indicated by this field when it takes the payload from the IPB 38.

5. Raw Frames

A frame that has been received on the Fibre Channel 14 may be fully encapsulated into a POS frame and sent out on the POS interface 12. In one embodiment, there are two modes available to accomplish this operation, as will now be described.

The first mode, according to this embodiment, is a dedicated raw frame mode. When the Ingress Fibre Control (IFC) 46 logic is programmed for this mode, each frame that is received from the Fibre 14 may be put into the IPB 38 in it's entirety, including FCBB characters for the SOF (Start of Frame) and EOF (End of Frame) characters of the frame. While it should be appreciated that less then the entire frame may be out into the IPB 38, for illustrative purposes the following discussion assumes that the entire frame is put into the IPB 38.

In addition to being put into the IPB 38, the FC header may also be placed into an entry in one of the ingress FC header queues (e.g., IFIQ 30 and/or IFPQ 32). From this point on, the frame may be processed in the same manner as a normal Pass-Through frame. In one embodiment, the PRC 20 creates a POS header in the next available entry in the IPPQ 28, copies the payload segment handle to the queue entry, and releases the entry to the hardware. When the entry reaches the head of the queue, the hardware may encapsulate the entire FC frame in a POS frame and send it out on the POS interface 14.

The second mode, according to this embodiment, is the interleave mode. In one embodiment, this mode allows raw frames to be interleaved with normal frames. In this mode, the hardware need not know in advance if an incoming FC frame will pass through as a raw frame, or if only the payload will be sent out on the POS interface. Moreover, in this mode the FC frame may be received in the same manner described above Section I.C.1.

After the PRC 20 has been notified of the arrival of the frame, it creates a POS header in the next available entry in the IPPQ 28 and copies the payload handle to the entry, according to one embodiment. The PRC 20 may then determine if the frame should be treated as a raw frame or as a normal frame.

If the frame is to be treated as a raw frame, in one embodiment the following additional steps are performed before the POS HQM 24 entry is turned over to the hardware:

First, the PRC 20 copies the FC header from the FC HQM 24 entry to the POS HQM 24 entry. In this embodiment, the FC header may be written to the spare byte locations that immediately follow the POS header. The length of the FC header may then be written to a field (e.g., the hdr_size field) in the POS HQM 24 entry. This field can be used to tell the hardware that additional bytes (the FC header) will be taken from the POS HQM 24 entry after the POS header has been transferred, but before the payload is transferred.

Next, the PRC 20 copies the PC CRC checksum from the entry in the PC HQM 24 to the entry in the POS HQM 24 entry, according to one embodiment. In another embodiment, the PRC 20 may then tell the hardware to transfer this field after the payload by setting a bit in a field of the POS HQM 24 entry. In one embodiment, the bit that is set is the imm-payId bit in the payId_src field. In yet another embodiment, the PRC 20 may also indicate the length of the CRC checksum in the imm_payId_size field of the POS HQM 24 entry.

After completing these steps, the PRC 20 may then turn the entry in the POS HQM 24 entry over to the hardware. In one embodiment, when the entry reaches the head of the queue, the hardware builds the POS frame as follows: First, the POS header is generated using data from the POS HQM 24 entry. Second, the FC Header is transferred from the POS HQM 24 entry. Third, the FC payload is transferred from the payload buffer segment. Fourth, the FC CRC is transferred from the POS HQM 24 entry. Finally, the generated POS frame CRC is transferred.

6. Cut-Through and Store-and-Forward Modes

In embodiment, ASIC 10 may provide two modes of operation. With the first mode, referred to herein as the Store-and-Forward mode, frames are received in their entirety from the Fibre Channel 14 before they are sent out on the POS interface 12. Alternatively, a Cut-Through mode may be used. As will be discussed in greater detail below in Section II, after a frame header and a programmable number of payload bytes have been received on the Fibre Channel 14 in this mode, the frame may be output on the POS interface 12. Thus, receiving and sending operations may overlap. In one embodiment, Cut-through mode may be enabled on a frame-by-frame basis.

7. Arbitration

In one embodiment, ingress POS Frames may originate in either the IPPQ 28 or the IPIQ 26. At any point in time, there may be multiple POS frame headers in each of these queues waiting to go out on the POS interface 12.

Within each queue, POS frames will be output in the order in which they were released to the hardware, according to one embodiment. However, the same principle need not apply between queues. For example, frames that are waiting in one queue may be delayed while newer frames in the other queue go out on the POS interface 12.

In one embodiment, the arbitration algorithm has two settings: 'ping-pong' and 'sequence'. When the arbiter is programmed for ping-pong mode, ingress POS frames may be taken from the IPPQ 28 and the IPIQ 26 in alternating order, one at a time from each queue. When the arbiter is programmed for sequence mode, frames from the IPPQ 28 which belong to the same command context may be given priority. Thus, once a context begins, all frames belonging to it may be transmitted in an uninterrupted fashion. In such a case, at the end of each context (or when the queue is empty), a frame from the POS Internal Queue (e.g., IPIQ 26) may then be transmitted.

8. Ingress Error Handling

As with the Egress path, Ingress error handling for may be accomplished by a combination of hardware error detection and software error recovery procedures. The following will describe one embodiment of the hardware detection capabilities of the ASIC 10 ingress path.

In one embodiment, each FC frame received by ASIC 10 will typically contain a frame CRC checksum and an EOF transmission word. When a checksum error or an EOFni is detected, or any other Fibre-Channel-specific error is detected during the reception of a frame, a status bit may be set in the segment of the IPB 38 that received the payload. Moreover, the manner in which the error is handled may be dependent on whether the frame header is routed to the Pass-Through Path or the Internal Path.

If the frame is routed to the Internal Path, the PRC 20 may be notified of the arrival of the frame after the payload has been fully received. The PRC 20 may then check the receive status before processing the payload. In one embodiment, if the check reveals that an error condition occurred while receiving the FC frame, a software recovery procedure is called. It should be appreciated that the software recovery procedure called may include returning the payload buffer segment to the free pool, and releasing the HQM 24 entry to the hardware.

If the frame is routed to the Pass-Through Path, the PRC 20 may be notified of the arrival of the FC frame after the header is received, but while the payload is still in transit. In one embodiment, upon notification the PRC 20 creates a POS header in the IPPQ 28 and releases the entry to the hardware. While this will normally occur before the POS CRC error is detected, it may also occur afterwards.

In order to handle this situation, the hardware that assembles the outgoing POS frames may be designed to also examine the status field of the indicated payload buffer segment before it initiates each POS frame. In such an embodiment, if the status field indicates that a problem was encountered while receiving the FC frame, the state machine may transfer this status information to the POS HQM 24 entry, turn the entry over to the software, and halt without generating the POS frame. The software may then decide how to recover from the error. In one embodiment, the recovery procedure includes returning the payload buffer segment to the free pool and returning the POS HQM 24 entry to the hardware.

If, on the other hand, Cut-Through Mode is enabled, the hardware may start sending the POS frame out before the FC receive error has been detected. The error will typically be detected, however, before the end of the POS frame has been transmitted. When this situation occurs, the hardware may be given the option (programmable) of either corrupting the outgoing POS frame CRC, or indicating a 'Receive Frame' error on the POS interface 12. In either case, the status field of the entry in the POS HQM 24 may be updated with information about the error. In one embodiment, the entry is also turned over to the software and the hardware state machine halted. In such a case, the software may then decide how to recover from the error.

In the example given above, the frame with the CRC error advanced to the head of the IPPQ 28 before the software became aware of the error. By that time, the queue could have contained headers for additional frames belonging to the same context. Furthermore, these frames could be interleaved with frames from other contexts. In order to allow the PRC 20 to easily purge frames belonging to a specific context from the queue, a 'skip' bit may be provided in each queue entry. In this embodiment, when an error is detected the processor can examine each entry in the queue and set this bit in each frame it wants to purge. Thereafter, the queue may be processed in order, beginning with the entry after the one with the error. Thus, in one embodiment, each time an entry with the skip bit set reaches the head of the queue, its contents may then be ignored, the entry returned to the software, and the next entry in the queue is processed.

II. Cut-Through Data Processing Model

The traditional method for processing frames using a protocol bridge is to wait for the entire frame to be received before beginning the frame-processing procedure (Store-Forward Model). However, in order to reduce the latency of frames passing through a device bridging two different protocols (such as ASIC 10), one aspect of the present invention is to not wait for the entire frame to be received before processing/translating the frame (Cut-Through Model).

For frames containing an encapsulated payload that are passed through the device and translated from a source protocol to a destination protocol (Pass-Through frames), in one embodiment processing may begin as early as when the frame header is received. For frames consumed by the device itself (Internal frames), it may be desirable to wait for the entire frame to be received, although processing for Internal frames may also begin at an earlier point.

Figure 2B:
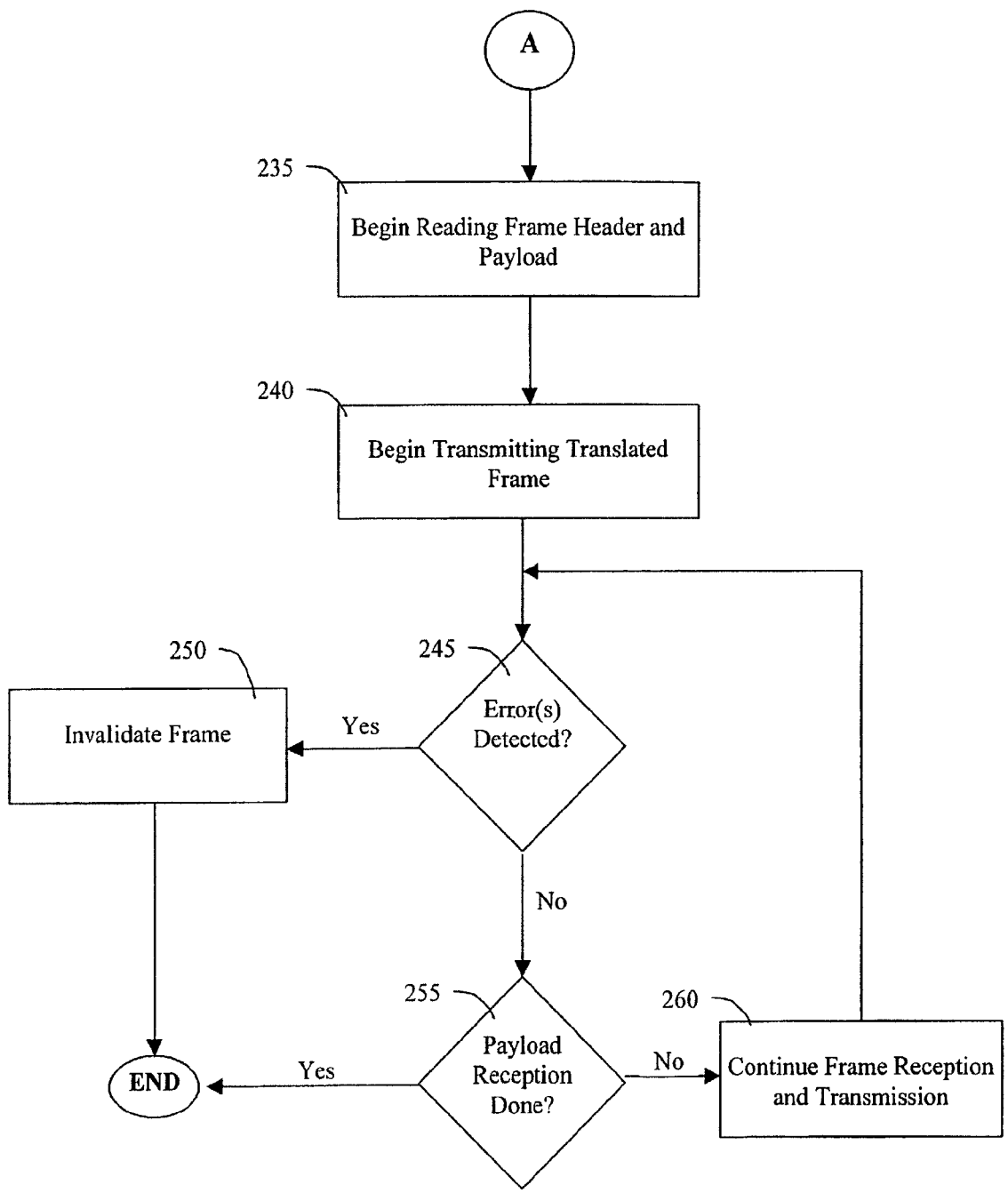

Referring now to FIG. 2A-2B, one embodiment for performing a Cut-Through frame processing procedure is depicted. The Cut-Through process 200 begins at block 205 where the protocol bridge (e.g., ASIC 10) begins to receive a data frame. While it should be appreciated that the frame may be received from any type of network connection according to any type of transport protocol, in one embodiment the frame is a POS frame. In another embodiment, the frame is an FC frame. The following discussion will refer to the protocol of a frame that is received into the protocol bridge as the 'source protocol.' In turn, the protocol of the interface to which the frame is to be transmitted will be referred to as the 'destination protocol.' Moreover, the side of the protocol bridge that is to receive the frame having the source protocol will be referred to as the 'receive side,' while the side of the protocol bridge which is to transmit the frame according to the destination protocol will be referred to as the 'transmit side.'

Shortly after the frame begins to be received, a temporary storage area may be allocated to the frame. Thus, in the embodiment of FIG. 2A the buffer segment that is to be used to hold the payload of the incoming frame is allocated by the ASIC 10 at block 210.

Continuing to refer to FIG. 2A, at block 215 the PRC 20 is notified of the incoming frame, according to one embodiment. Simultaneously, the allocated buffer segment may begin to be filled with the frame's payload by the ASIC 10 hardware (block 220). In another embodiment, the hardware may be programmed with the number of bytes of a frame that must be received before notifying the PRC 20 that it can now begin to process the frame. In one embodiment, this number of bytes is equal to the number of bytes in the header. In yet another embodiment, the programmed number of bytes it at least equal to that number of bytes required to allow the PRC 20 to accomplish the required protocol translation.

Since it may be desirable to fully receive internal frames before processing them, in one embodiment Internal and Pass-Through frames are routed to separate paths to allow the independent application of Store-Forward and Cut-Through Models on each path. One or more routing control bits found in the frame's header may be used to determine the type of frame and intended destination queue. In one embodiment, these bits are located in a programmable location in the header that allows for support for different protocols.

Once the PRC 20 has been notified of the frame's existence it may begin to perform the necessary protocol translation functions (block 225). It should be understood that the exact translation operations to be carried will depend on both the source protocol and destination protocol. In addition, the PRC 20 may also begin reading from the selected buffer while it is still being written to from the receive side. Once the necessary translation operations have been carried out, the transmit side of the protocol bridge may be configured with the number for the selected buffer segment (block 230). Process 200 continues to block 235 of FIG. 2B where the PRC 20 may turn the frame over to the hardware which may, in turn, begin sending it out on the transmit side according to the destination protocol (block 240).

Since the transmit side of the device (e.g., ASIC 10) can begin to send the payload of a frame that has not yet been completely received, a method may be implemented to invalidate the frame in case of a receive error that occurs after the PRC 20 has configured the transmit side. To that end, at block 245 a determination is made as to whether any receive errors have occurred. If an error has occurred, process 200 continues to block 250 where the frame is invalidated, which may happen in a variety of ways. In one embodiment, the maskable receive status associated with the payload buffer segment can cause the hardware, in the case of Fibre Channel, to terminate the frame with an EOFni, or in the case of SPI-3, to assert the packet error signal (RERR/TERR) with the EOF. In another embodiment, the hardware can corrupt the frame CRC. The transmit hardware can also use this method to invalidate the frame if any errors are detected during transmission, such as an expected payload size mismatch, an internal memory parity error, or if necessary, a buffer segment underflow.

When implementing Cut-Through data flow on Pass-Through frames, the transmission and reception of a translated-protocol frame may overlap. In such a case, it may be beneficial for the transmitting engine to be aware of the final reception status of the frame before completing the transmission. Thus, where no error has been detected, process 200 continues to block 255 where a determination has been made as to whether the entire payload has been received. In one embodiment, each payload buffer segment has an associated frame status. When the last word of the frame is written into the buffer segment, the frame status may be captured by the buffer manager. When the last word is read out of the buffer, the transmit hardware may then be presented with this status, which may then be communicated back to the PRC 20, along with the transmit status of the frame. In another embodiment, hardware may optionally act on this status earlier if a critical error has been detected in the frame.

In the above-described manner, the invention enables a protocol bridge to translate data frames from one protocol to another as they are being received on a network interface. In addition, the invention enables the protocol bridge to send out the translated data frames on a second network interface before the protocol bridge has even finished receiving the original data frames over the first network.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

The invention claimed is:

1. A network bridging device comprising:
  a first network interface to receive a data frame from a first network having a source protocol, wherein the data frame includes one or more routing control bits to be used to determine if the data frame is either a pass-through frame or an internal frame, wherein the one or more routing control bits are located in a programmable location of a data frame header that allow support for one or more different protocols;
  a memory coupled to said first network interface;
  a processor coupled to the memory; and,
  a circuit coupled to the first network interface and the memory, the circuit sending a transmit notification to the processor while storing the data frame in the memory;
  wherein the processor begins reading the data frame from the memory in response to the transmit notification and prior to the receipt of the entire data frame, and translates the data frame from the source protocol to a destination protocol;
  a second network interface coupled to said processor for transmitting the translated data frame to a second network, wherein one of the first or second network is a packet-over SONET Physical Layer (POS/PHY) network, wherein receiving and transmitting operations in the network bridging device overlap to reduce frame latency, and wherein the processor translates the data frame from the source protocol to the destination protocol and causes transmission of the translated data frame to begin while an original data frame's payload is being received, and wherein the overlap is enabled on a frame by frame basis.

2. The device of claim 1 further comprising:
  a second network interface coupled to the processor for transmitting the translated data frame.

3. The device of claim 2, wherein the circuit detects an error in the received data frame and sends an error notification to the processor; and
  wherein the processor inserts an error message into the translated data frame.

4. The device of claim 2, wherein:
  the first network interface receives the data frame at a first data rate;
  the second network interface transmits the translated data frame at a second data rate, greater than the first data rate;
  the circuit detects insufficient data in the memory and sends an empty buffer notification to the processor; and
  the processor inserts an error message into the translated data frame in response to the empty buffer notification.

5. The device of claim 2 wherein either the first network interface receives the data frame in a source protocol selected from a group consisting of packet-over-SONET, Fibre Channel, System Parallel Interface, Utopia, and Flexbus or the second network interface transmits the translated data frame in a destination protocol selected from a group consisting of packet-over-SONET, Fibre Channel, System Parallel Interface, Utopia, and Flexbus, but not both.

6. The device of claim 1, wherein the first network interface receives a data frame with a header having a first number of bits and a payload; and
  wherein the circuit sends the transmit notification to the processor in response to storing the first number of bits in the memory.

7. The device of claim 1, wherein the circuits stores a reception complete message in the memory upon receiving the entire data frame; and
  wherein the processor reads reception complete message from memory to determine that the data frame has been completely received.

8. A method for network bridging, the method comprising:
  receiving a data frame from a first network having a source protocol at a first network interface, wherein the data frame includes one or more routing control bits to be used to determine if the data frame is either a pass-through frame or an internal frame, wherein the one or more routing control bits are located in a programmable location of a data frame header that allow support for one or more different protocols;
  storing the data frame in memory;
  reading the data frame from the memory, prior to the receipt of the entire data frame;
  translating the data frame from the source protocol to a destination protocol; and
  transmitting the translated data frame to a second network via a second network interface, wherein one of the first or second network is a packet-over SONET Physical Layer (POS/PHY) network, wherein receiving and transmitting operations in the network bridging device overlap to reduce frame latency, and wherein the processor translates the data frame from the source protocol to the destination protocol and causes transmission of the translated data frame to begin while an original data frame's payload is being received, and wherein the overlap is enabled on a frame by frame basis.

9. The method of claim 8 further comprising:
transmitting the translated data frame via a second network interface.

10. The method of claim 9, further comprising:
detecting an error in the received data frame; and
inserting an error message into the translated data frame.

11. The method of claim 9, wherein receiving the data frame includes receiving the data frame at a first data rate;
wherein transmitting the translated data frame includes transmitting the translated data frame at a second data rate, greater than the first data rate;
the method further comprising:
detecting insufficient data in the memory; and
inserting an error message into the translated data frame in response to detecting insufficient data.

12. The method of claim 9, wherein either receiving the data frame includes receiving the data frame in a source protocol selected from a group consisting of packet-over-SONET, Fibre Channel, System Parallel Interface, Utopia, and Flexbus, or transmitting the translated data frame includes transmitting the translated data frame in a destination protocol selected from a group consisting of packet-over-SONET, Fibre Channel, System Parallel Interface, Utopia, and Flexbus, but not both.

13. The method of claim 8, wherein receiving the data frame includes receiving a data frame with a header having a first number of bits and a payload; and
wherein reading the data frame from memory includes reading the data frame in response to storing the first number of bits in the memory.

14. The method of claim 8, further comprising:
storing a reception complete message in the memory upon receiving the entire data frame; and
wherein reading the data frame from the memory includes determining that the data frame has been completely received in response to reading the reception complete message.

* * * * *